United States Patent [19]

Werther et al.

[11] Patent Number: 4,828,641

[45] Date of Patent: May 9, 1989

[54] JOINING THE CUT EDGES OF PHOTOPOLYMERIZED FLEXOGRAPHIC PRINTING PLATES

[75] Inventors: Heinz-Ulrich Werther, Wachenheim; Hartwig Pieper, Frankenthal; Willi Schabinger, Karlsruhe; Klaus Kessler, Ettlingen, all of Fed. Rep. of Germany

[73] Assignee: BASF Aktiengesellschaft, Ludwigshafen, Fed. Rep. of Germany

[21] Appl. No.: 178,904

[22] Filed: Apr. 7, 1988

[30] Foreign Application Priority Data

Apr. 9, 1987 [DE] Fed. Rep. of Germany ....... 3712070

[51] Int. Cl.[4] ........................ B32B 31/04; B41D 5/00; C09J 3/00

[52] U.S. Cl. ................................ 156/258; 156/272.2; 156/304.1; 156/304.3; 156/304.5; 101/375; 101/376; 101/401.1; 101/401.3; 101/415.1

[58] Field of Search ............... 156/185, 187, 193, 258, 156/304.1, 304.3, 304.5, 272.2; 101/DIG. 12, DIG. 27, 375, 376, 401.1, 401.3, 415.1; 430/271, 300, 306

[56] References Cited

U.S. PATENT DOCUMENTS

| | | | |
|---|---|---|---|
| 4,589,338 | 5/1986 | Collins et al. | 101/415.1 |
| 4,727,806 | 3/1988 | Green | 101/415.1 |
| 4,758,500 | 7/1988 | Schober et al. | 156/258 |

FOREIGN PATENT DOCUMENTS 2160882 1/1986 United Kingdom .

*Primary Examiner*—Caleb Weston
*Attorney, Agent, or Firm*—Keil & Weinkauf

[57] ABSTRACT

A method of joining the edges of flexographic printing plates on printing cylinders, which includes the following steps:

(i) fixing the printing plates to make-ready cylinders by means of a first double-sided self-adhesive film having the same area as the printing plate, (ii) cutting the printing plates to size so that they fit the printing cylinders, (iii) removing the cut printing plates from the make-ready cylinders and from the first self-adhesive films, (iv) fixing the cut printing plates by means of a second double-sided self-adhesive film, which has the same area as the printing plates and from 1.6 to 2.6 times the thickness of the first self-adhesive films, so that defined gaps result between the edges of the fixed printing plates, (v) filling the gaps between the edges to be joined, with a liquid photopolymerizable mixture of binders, photopolymerizable monomers and photopolymer, ization initiators and (vi) partially polymerizing the mixture under a transparent film cover by exposure to UV light until the elongation at break in the composite consisting of the solid gap closing compound and the printing plate material fulfils the condition $$R_S < R_{S/F} << R_F$$

where $R_S$ is the elongation at break of the partially polymerized gap closing compound, $R_{S/F}$ is the elongation at break in the interface between the gap closing compound and the printing plate material and $R_F$ is the elongation at break of the printing plate material.

5 Claims, No Drawings

JOINING THE CUT EDGES OF PHOTOPOLYMERIZED FLEXOGRAPHIC PRINTING PLATES

The present invention relates to a novel, improved method for joining the edges, which have been cut to size, of photopolymerized flexographic printing plates, which have relief layers and dimensionally stable base films, on a printing cylinder by (a) filling the gap between the edges to be joined, with a liquid photopolymerizable mixture consisting essentially of binders, photopolymerizable monomers which are compatible with these and photopolymerization initiators and (b) polymerizing the mixture under a firm cover which is transparent to light, by exposure to UV light.

Apart from the improvement according to the invention, a method of this type is disclosed in GB-A- No. 2 160 882.

The disadvantage of the known method is that the resulting gap closing compound is bonded very firmly to the material of the flexographic printing plate so that it is impossible to separate the edges again and remove the gap closing compound without causing damage to the printing plates.

Furthermore, the gap closing compound as such has a very high elongation at break so that, after production, it can be smoothed, adapted in its thickness to the printing plates and/or removed from the surface of the printing plates which runs along the joined edges only by mechanical abrasion, which has a very particular disadvantage if the edge joints intersect solid printing areas of the printing plates. This is because mechanical abrasion produces abrasion marks in the surface of the printing plates, the said marks having a different surface roughness and different ink transfer properties compared with the unabraded areas and therefore being visible in the printed product at the beginning of the printing process. Furthermore, because of its high elongation at break, the gap closing compound can only be cut, after which the residues remain very firmly adhering to the printing plate material. Alternatively, it can be torn apart only with great force, the printing plates being permanently damaged and no longer usable.

It is therefore not possible for a flexographic printing plate whose edges are joined and which is fixed to a printing cylinder to be separated from the printing cylinder in a simple manner, stored separately and, for reuse, mounted again on the same cylinder or on another printing cylinder. However, because flexographic printing plates are usually used several times for printing, this means that in practice either a new cylinder has to be produced for each printing plate or, in the course of time, a plurality of printing plates having one and the same motif have to be produced, which is completely unsatisfactory both economically and technically.

Furthermore, in the case of these flexographic printing plates joined at the edges and fixed to printing cylinders in a known manner, the pressing processes during printing may lead to deformation of the exactly abutting edges of the base films, which may greatly damage the gap closing compound.

It is an object of the present invention to improve the known method for joining the edges, which have been cut to size, of photopolymerized flexographic printing plates, which have relief layers and dimensionally stable base films, on a printing cylinder in such a manner that the disadvantages described above no longer occur.

We have found that this object is achieved by a novel method for joining the edges, which have been cut to size, of photopolymerized flexographic printing plates, which have relief layers and dimensionally stable base films, on a printing cylinder by (a) filling the gap between the edges to be joined, with a liquid photopolymerizable mixture consisting essentially of binders, photopolymerizable monomers which are compatible with these and photopolymerization initiators and (b) polymerizing the mixture under a firm cover which is transparent to light, by exposure to UV light, wherein ($a_1$) prior to step (a), the printing plates are fixed to make-ready cylinders by means of double-sided self-adhesive films 1 of the same area as the printing plates and are cut to fit the printing cylinders, after which they are removed from the make-ready cylinders and from the self-adhesive films 1 so that they can then be fastened to the printing cylinders by means of double-sided self-adhesive films 2 which are of the same area as the printing plates and from 1.6 to 2.6 times as thick as the self-adhesive films 1, and ($b_1$) in step (b), the mixture is polymerized partially until the elongation at break in the composite comprising the solid gap closing compound and the printing plate material fulfils the condition $$R_S < R_{S/F} << R_F$$

where $R_S$ is the elongation at break of the partially polymerized gap closing compound, $R_{S/F}$ is the elongation at break in the interface between the gap closing compound and the printing plate material and $R_F$ is the elongation at break of the printing plate material.

In principle, all photopolymerizable mixtures are suitable for filling the gap between the edges to be joined in step (a), provided that they are liquid and can be photopolymerized to elastomeric gap closing compounds by exposure to UV radiation.

In general, the suitable mixtures contain binders, photopolymerizable monomers which are compatible with these and photopolymerization initiators. Furthermore, they may contain conventional and known thermal polymerization inhibitors, antioxidants, antiozonants, plasticizers, fluxes, tackifiers, solvents and/or fillers.

Examples of photopolymerizable mixtures which are particularly suitable according to the invention are the solvent-free mixtures disclosed in GB-A- No. 2 160 882.

The photopolymerized flexographic printing plates used in the novel method may be the conventional flexographic printing plates which have relief layers and dimensionally stable base films or consist of these and which, as is known, are obtained by imagewise exposure of printing plates crosslinkable by photopolymerization and washing out of the unexposed and therefore uncrosslinked parts. Printing plates suitable for this purpose usually contain a photopolymerizable, relief-forming layer on a dimensionally stable base film.

In general, the flexographic printing plates obtainable in this manner have relief layer thicknesses of from 0.7 to 10 mm, preferably from 3 to 7 mm, and a relief height of from 0.5 to 5 mm.

The width of the gap between the edges to be joined should not in general exceed 2 mm or be less than 0.1 mm. According to the invention, gap widths of from 0.5 to 1.5 mm are advantageous.

In the method according to the invention, the printing cylinders conventionally employed in flexographic printing are used.

For exposure of the photopolymerizable mixtures in step (b), the commercial UV light sources, such as the superactinic fluorescent tubes, are suitable.

Suitable firm covers which are transparent to light are sheets or films of suitable plastics, such as polycarbonate, polypropylene, polyethylene or polyethylene terephthalate, which are pressed onto the gap filled with photopolymerizable mixture. The sheets have roughly the same curvature as the printing cylinder surface. The additional use of shrink films or plastic stockings is advantageous in the case of edge joining on a printing cylinder.

In the method according to the invention, the printing plates are fixed to make-ready cylinders with the aid of conventional self-adhesive films 1 before the liquid photopolymerizable mixture is introduced (step (a)).

The self-adhesive films 1 have the same area as the printing plates.

The make-ready cylinders or mounting cylinders to be used in the novel method are part of conventional, commercial mounting apparatuses for making ready flexographic printing plates for multi-color printing.

The printing plates fixed to the make-ready cylinders are cut to size on the printing cylinders, after which they are removed from the make-ready cylinders and from the self-adhesive films 1. Thereafter, the printing plates cut exactly to size are fixed to the printing cylinders by means of conventional, double-sided self-adhesive films 2.

The self-adhesive films 2 to be used in the novel method have the same area as the printing plates. However, they are from 1.6 to 2.6, in particular from 1.8 to 2.2, times the thickness of the self-adhesive film 1.

It is particularly advantageous in the novel method to use make-ready cylinders which have one or more notches parallel to the axis and one or more notches at right angles to this direction. The printing plates are fixed to these make-ready cylinders in such a way that the notches come to rest under the cutting points.

The edges of the printing plates and of the self-adhesive films are then cut exactly to size along these notches, the cutting apparatuses being used for this purpose being guided in these notches.

The conventional cutting apparatuses may be used for this purpose. In the novel method, it is particularly advantageous to use knives which are at 100°-150° C., in particular 110°-130° C., have a trapezoidal blade, can be displaced parallel to the axis of the make-ready cylinders and can be fixed at an angle of 0° and of 90° to the cylinder axes.

Suitable knives having a trapezoidal blade are the conventional carpet knives. These can be heated with the aid of soldering irons, to which they are fastened.

This arrangement of blade and soldering iron can be connected via toggle joints with rods which are mounted below the front of the make-ready cylinders and run parallel to their axis, and the arrangements comprising blade, soldering iron and toggle joint can be moved parallel to the axis along these rods.

The toggle joints themselves can be fixed in two positions in such a way that the knife is fixed at an angle of 0° or of 90° to the cylinder axes.

For cutting to size in the direction parallel to the axis, the make-ready cylinders with the attached printing plates are fixed in the desired positions and the knives are moved.

For cutting to size in the direction at right angles to the axis of the make-ready cylinders, the knives are fixed in the desired position and the make-ready cylinders are rotated.

In contrast to the known method, in the novel method the photopolymerizable mixture which serves as the subsequent gap closing compound is polymerized only partially, and not completely, in step (b). The degree of photopolymerization or photocrosslinking must be chosen neither too high nor too low, since otherwise the particular advantages of the method according to the invention are lost. The photopolymerizable mixture must therefore be partially polymerized only until the elongation at break in the composite comprising solid gap closing compound and printing plate material fulfills the condition $$R_S < R_{S/F} << R_F.$$

$R_S$ is the elongation at break of the solid gap closing compound. It is from 1 to 2 kp/2 cm, depending on the photopolymerizable mixture used.

$R_{S/F}$ is the corresponding elongation at break in the interface between the gap closing compound and the printing plate material. It is from 2 to 3 kp/2 cm, depending on the materials used.

$R_F$ is the elongation at break of the flexographic printing plate material. It is 6 kp/2 cm or higher, depending on the material used.

The values for the elongation at break can be determined in a simple manner using an Instron apparatus on 2 cm wide samples at a take-off angle of 90°.

The degree of photopolymerization or of photocrosslinking can very easily be adjusted via the exposure time. In the case of given mixtures and flexographic printing plates, the optimum degree of polymerization or of crosslinking at which the condition according to the invention is fulfilled can therefore readily be determined by simple preliminary experiments.

In view of the prior art, it was surprising that the object of the invention could be achieved with the aid of this measure without the well known disadvantages of incompletely polymerized photopolymerizable mixtures manifesting themselves. For example, such mixtures are known to be less elastomeric, mechanically less stable and less resistant to solvent than completely polymerized mixtures, so that they appeared from the outset to be completely unsuitable for forming between the edges of flexographic printing plates a permanently tight gap closure capable of withstanding a high mechanical load.

In step (a), the liquid photopolymerizable mixture can be introduced into the gap between the two edges to be joined, for example by means of a high pressure injection gun or by means of a cartridge having a bent outlet nozzle, from which the mixture is pressed out with the aid of a screw thread. If a high pressure injection gun is used here, it is advantageous to cover the gap; where a cartridge having an outlet nozzle is used, it is generally guided through the uncovered gap.

This generally results in slightly curved liquid gap fillings, and the surface of the printing plates which runs along the edges to be joined may be covered by the liquid mixture. It is therefore particularly advantageous for the novel method to cover these parts of the surface of the printing plates with self-adhesive strips. Conventional self-adhesive strips can be used for this purpose. The self-adhesive strips are then removed after the filling process (step a), together with the excess mixture which has flowed over the gap.

Before exposure in the procedure according to the invention, the gap fillings are advantageously covered with polyethylene terephthalate films, after which the printing cylinders together with the attached printing plates and polyethylene terephthalate films are bandaged with the known plastic stockings in a conventional manner. As a result of this bandaging, the polyethylene terepthalate films are pressed firmly onto the gap fillings, with the result that part of these gap fillings may once again be pressed onto the surface of the printing plates which runs along the edges to be joined.

Exposure of the gap fillings consisting of the liquid photopolymerizable mixture in the novel procedure gives the solid gap closing compounds whose elongation at break fulfils the claimed critical condition. These gap closing compounds may be slightly curved. They may also have an uneven surface. Furthermore, they may be thicker than the edge regions of the printing plates. In addition, parts of the gap closing compound may be present on the surface of the printing plates which runs along the joined edges. It may therefore be necessary for these gap closing compounds to be smoothed and/or adapted in their thickness to the printing plates and/or for the parts of the gap closing compound which are present on the surface of the printing plates which runs along the joined edges to be removed. This can be done using the well known mechanical methods, such as grinding, cutting or blasting. Because of the advantageous properties of the gap closing compounds obtained in the novel procedure, gentle rubbing or scraping away of the relevant parts of the gap closing compounds is sufficient. In certain circumstances, this may even be carried out manually. Thus, the surface of the printing plates is not damaged, nor are its surface roughness and its ink transfer properties changed.

The novel method for joining the edges, which are cut to size, of photopolymerized flexographic printing plates, which have relief layers and dimensionally stable base films, on a printing cylinder has particularly unexpected technical effects.

Thus, on the one hand, the novel method is used to produce gaps between printing plate edges to be joined, which are so narrow and exact that they do not manifest themselves in a disadvantageous manner even if they intersect solid printing areas of the printing plates.

On the other hand, the edges of the dimensionally stable base films of the printing plates no longer abut one another in the gaps and therefore cannot have disadvantageous effects.

The partially polymerized gap closing compounds present in these gaps and produced in the novel procedure are easy to smooth and/or to adapt in their thickness to the printing plates. Furthermore, parts of the gap closing compounds can be removed in a simple manner from the surface of the printing plates which runs along the joined edges, without the surface being damaged or adversely affected in its surface roughness or its ink transfer properties as a result.

The gap closing compounds join the edges seamlessly and, under printing conditions, are permanently tight and resistant to printing ink solvents.

Furthermore, they are not deformed or damaged by the tumbling forces occurring during printing, so that, even after very long print runs, the compounds are neither warped nor even detached. Hence, the gaps are scarcely visible in the printed image. Moreover, the gap closing compounds permit the edges to be separated easily and cleanly again if the flexographic printing plate is to be removed from the printing cylinders and stored separately. Separation is effected in particular at the interface between the gap closing compound and the flexographic printing plate material; it may also occur to a minor extent in the gap closing material itself. After separation, the residues of the gap closing material which may still adhere to the edges can be easily rubbed off or scraped off without damaging the printing plates. For reuse, the flexographic printing plates can be fixed to the printing cylinders again, after which their edges can be joined again in the manner according to the invention. The method thus permits edge joining which to a certain extent is reversible. Furthermore, the flexographic printing plates whose edges have been joined by the novel method exhibit better printing behavior than those which have been joined by a conventional method.

EXAMPLE

Production of a flexographic printing cylinder by the novel method; production method:

A commercial photopolymerizable flexographic printing plate consisting of a photopolymerizable, relief-forming layer based on a butadiene/isoprene/styrene block copolymer rubber and of a dimensionally stable base film of polyethylene terephthalate (®Nyloflex FA flexographic printing plate from BASF Aktiengesellschaft having the dimensions 40 cm×61 cm×2.84 mm) was exposed imagewise, developed, washed out and aftertreated in a conventional manner.

The photopolymerized flexographic printing plate obtained in the known manner and having a thickness of 2.84 mm and a relief height of 1.2 mm was cut to 40 cm×60 cm by fixing it, with the aid of a 0.1 mm thick double-sided self-adhesive film 1 measuring 40 cm×61 cm, to the make-ready cylinder of a commercial mounting apparatus (Bieffebi mounting apparatus) in such a way that a notch parallel to the axis and cut into the make-ready cylinder came to rest exactly underneath the subsequent cutting point in the flexographic printing plate. This cutting point was located in a solid printing area of the printing plate.

The knife used for cutting consisted of a trapezoidal blade of a commercial carpet knife, the said blade being clamped in a soldering iron. This in turn was connected via a toggle joint to a rod system mounted underneath the front of the make-ready cylinder and parallel to the axis of the said cylinder. The knife blade was heated to 110° C., inserted into the notch in the make-ready cylinder by bending the toggle joint and fixed at an angle of 0° to the cylinder axis. Thereafter, the make-ready cylinder was locked. The entire arrangement of knife, soldering iron and toggle joint was then displaced parallel to the axis along the rod system, the flexographic printing plate and the self-adhesive film 1 being cut cleanly at the desired point.

The flexographic printing plate cut to size was then detached from the self-adhesive film 1 and mounted on a printing cylinder (circumference 40 cm) with the aid of a 0.2 mm thick double-sided self-adhesive film 2 measuring 40 cm×60 cm in such a way that the 60 cm long side of the printing plate was parallel to the cylinder axis. This resulted in a 1.2 mm wide gap, which was to be filled with gap closing compound, between the longitudinal edges of the printing plate on the printing cylinder.

The surface of the flexographic printing plate was covered with self-adhesive strips along the edges to be joined.

The gap closing compound was prepared using a photopolymerizable mixture comprising, based on its total amount, 68.4% by weight of a liquid 1,2-polybutadiene having a number average molecular weight of 10,000 and containing 2.5% by weight, based on the polybutadiene, of carboxyl groups (liquid binder), 30% by weight of trimethylolpropane triacrylate (photopolymerizable monomer), 1.5% by weight of benzil dimethyl acetal (photopolymerization initiator) and 0.1% by weight of 2,6-di-tert-butyl-p-cresol (thermal polymerization inhibitor).

This mixture was introduced into a cartridge and pressed into the gap through a 0.8 mm wide, slightly bent outlet nozzle by means of a screw thread, the outlet nozzle being guided along the gap. This resulted in a filling which had a slight curvature and projected beyond the level of the printing plate surface. Some of the filling flowed over the flexographic printing plate surface covered with self-adhesive strips. These parts were removed from the flexographic printing plate surface, together with the self-adhesive strips.

The gap filling was then covered with a polyethylene terephthalate film, and the entire flexographic printing cylinder was wrapped with a polyethylene stocking running along the cylinder axis. The mixture in the gap was then exposed in a tubular exposure unit for 15 minutes. After this exposure time, which was determined by preliminary experiments, the mixture was polymerized to such an extent that the elongation at break $R_S$ (1.5 kp/2 cm) and the elongation at break $R_{S/F}$ (2 kp/2 cm) together with the elongation at break $R_F$ (6.5 kp/2 cm) fulfilled the condition according to the invention. The elongations at break were determined in a known manner using an Instron apparatus, on 2 cm wide samples at a take-off angle of 90°.

After removal of the polyethylene stocking and the polyethylene terephthalate film, the gap closing compound was smoothed by rubbing with a soft leather cloth or a plastic scraper, adjusted in its thickness to the flexographic printing plate and removed from the flexographic printing plate surface running along the joined edges. In this procedure, neither the printing plate nor the gap closing compound was damaged in any way.

The ready-prepared flexographic printing plate cylinders were used in a conventional flexographic printing press to print plastic webs using a conventional alcohol-soluble flexographic printing ink. Even after a print run of $4\times10^4$ copies, image reproduction was of excellent quality. The gap closure was scarcely visible in the printed image. When the printing process was complete, the gap closing compound showed absolutely no signs of deformation, cracking or detachment. However, the gap closing compound could be very easily removed from the gap manually or with the aid of a plastic trowel, without damaging the flexographic printing plate.

After removal of the gap closing compound, the flexographic printing plate was removed from the printing cylinder and stored separately. For reuse, it was once again fixed to the printing cylinder using a self-adhesive film 2, and the gap between its edges was once again closed in the manner described above.

COMPARATIVE EXPERIMENT

The Example was repeated, except that 1. a make-ready cylinder without a notch was used,
2. the printing plate was fixed to the printing cylinder by means of the self-adhesive film 1 and
3. the liquid photopolymerizable mixture was completely polymerized in the course of 25 minutes.

After this exposure time, the elongation at break did not fulfil the condition according to the invention but instead fulfilled the following condition:

$$R_{S/F}(3\text{ kp/2 cm}) < R_S(7\text{ kp/2 cm}) \approx R_F(6.5\text{ kp/2 cm}).$$

The parts of the gap closing compound which project beyond the level of the flexographic printing plate had to be cut away with a sharp knife, owing to their great toughness and strength. Thereafter, the gap closing compound had to be smoothed using a grinding apparatus. Because of the pronounced elastomeric properties of the compound, both grinding and cutting were difficult to carry out; it was impossible to avoid damage to the flexographic printing plate.

During printing on the flexographic printing press, scratches and grinding marks were therefore visible in the printed image even at the beginning of the printing process. After a print run of $4\times10^4$ copies, the gap closing compound and the edges of the printing plate were slightly deformed. Image reproduction was in general of poorer quality than in the preceding Example.

After printing, the gap closing compound could only be cut with a sharp knife. Residues of the gap closing compound remained adhering firmly to the printing plate material. In an attempt to cut away, tear away or grind away these firmly adhering parts, the edge areas of the flexographic printing plate were severely damaged. Hence, the flexographic printing plate was no longer suitable for further use.

We claim:

1. A method for joining the edges, which have been cut to size, of photopolymerized flexographic printing plates, which have relief layers and dimensionally stable base films, on printing cylinders comprising the following steps:

(i) fixing the printing plates to make-ready cylinders by means of a first double-sided self-adhesive adhesive film having the same area as the printing plate, (ii) cutting the printing plates to size so that they fit the printing cylinders, (iii) removing the printing plates, which have been cut to size, from the make-ready cylinders and from the first self-adhesive films, (iv) fixing the printing plates which have been cut to size, by means of a second double-sided self-adhesive film, which has the same area as the printing plates and from 1.6 to 2.6 times the thickness of the first self-adhesive films to the printing cylinders, so that defined gaps result between the edges of the fixed printing plates, (v) filling the gaps between the edges to be joined, with a liquid photopolymerizable mixture consisting essentially of binders, photopolymerizable monomers which are compatible with these and photopolymerization initiators and (vi) partially polymerizing the mixture under a film cover which is transparent to light, by exposure to UV light until the elongation at break in the composite consisting of the solid gap closing compound and the printing plate material fulfils the condition $$R_S < R_{S/F} << R_F$$

where $R_S$ is the elongation at break of the partially polymerized gap closing compound, $R_{S/F}$ is the elongation at break in the interface between the gap closing compound and the printing plate material and $R_F$ is the elongation at break of the printing plate material.

2. The method of claim 1, wherein, after step (iv) and before step (v), self-adhesive strips are applied to the printing plate surface which runs along the edges to be joined, the said strips being removed after step (v) together with excess mixture which has flowed out of the gap.

3. The method of claim 1, wherein, after step (vi), the gap closing compounds are smoothed, and adjusted in their thickness to the thickness of the printing plate.

4. The method of claim 1, wherein make-ready cylinders having one or more notches running parallel to the axis and one or more notches running at right angles to this direction are used for cutting the printing plates to size, and, in cutting the plates to size, the printing plates and the self-adhesive films are cut at the desired cutting point by means of a knife which is guided in these notches, can be displaced parallel to the axis and fixed at an angle of 0° and of 90° to the cylinder axis, is at from 100° to 150° C. and has a trapezoidal blade.

5. The method of claim 1, where, after step (vi), the gap closing compounds are removed from the surface of the printing plate which runs along the joined edges.

* * * * *